(12) United States Patent
Takahashi et al.

(10) Patent No.: US 11,423,269 B2
(45) Date of Patent: Aug. 23, 2022

(54) PRINTING APPARATUS

(71) Applicant: SCREEN HOLDINGS CO., LTD., Kyoto (JP)

(72) Inventors: Susumu Takahashi, Kyoto (JP); Asuka Muramatsu, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 24 days.

(21) Appl. No.: 17/178,878

(22) Filed: Feb. 18, 2021

(65) Prior Publication Data

US 2021/0287061 A1 Sep. 16, 2021

(30) Foreign Application Priority Data

Mar. 10, 2020 (JP) .............................. JP2020-040744

(51) Int. Cl.
*G06K 15/02* (2006.01)
*B41J 2/01* (2006.01)
*G06K 15/10* (2006.01)

(52) U.S. Cl.
CPC ............ *G06K 15/1868* (2013.01); *B41J 2/01* (2013.01); *G06K 15/022* (2013.01); *G06K 15/102* (2013.01); *G06K 15/1882* (2013.01)

(58) Field of Classification Search
CPC ............. G06K 15/1868; G06K 15/022; G06K 15/102; G06K 15/1882; G06K 15/1885; B41J 2/01; B41J 3/60; B41J 11/008; B41J 15/04

See application file for complete search history.

(56) References Cited

U.S. PATENT DOCUMENTS

| | | | | |
|---|---|---|---|---|
| 2008/0123157 A1* | 5/2008 | Kinoshita | .......... | G06K 15/1204 358/451 |
| 2014/0169843 A1* | 6/2014 | Igarashi | ............. | G03G 15/5058 399/301 |
| 2015/0371119 A1* | 12/2015 | Tosa | ................... | G06K 15/1868 358/1.9 |
| 2016/0124363 A1* | 5/2016 | Takahashi | .......... | G03G 15/5029 399/45 |

FOREIGN PATENT DOCUMENTS

JP 2014-144608 A 8/2014

* cited by examiner

*Primary Examiner* — Iriana Cruz
(74) *Attorney, Agent, or Firm* — McDermott Will & Emery LLP

(57) ABSTRACT

A printing apparatus for printing on a front surface of a printing medium, and thereafter printing on a back surface of the printing medium. The apparatus includes the following elements: a front surface print head for printing a front surface image based on front surface image data, over a surface page length on the front surface of the printing medium; a back surface print head for printing a back surface image based on back surface image data, on the back surface of the printing medium; a data corrector for creating corrected front surface image data by correcting an image size of the front surface image data based on elasticity information in the transport direction; and a printing controller for causing printing based on the corrected front surface image data, and controlling the back surface print head to perform printing on the back surface.

20 Claims, 6 Drawing Sheets

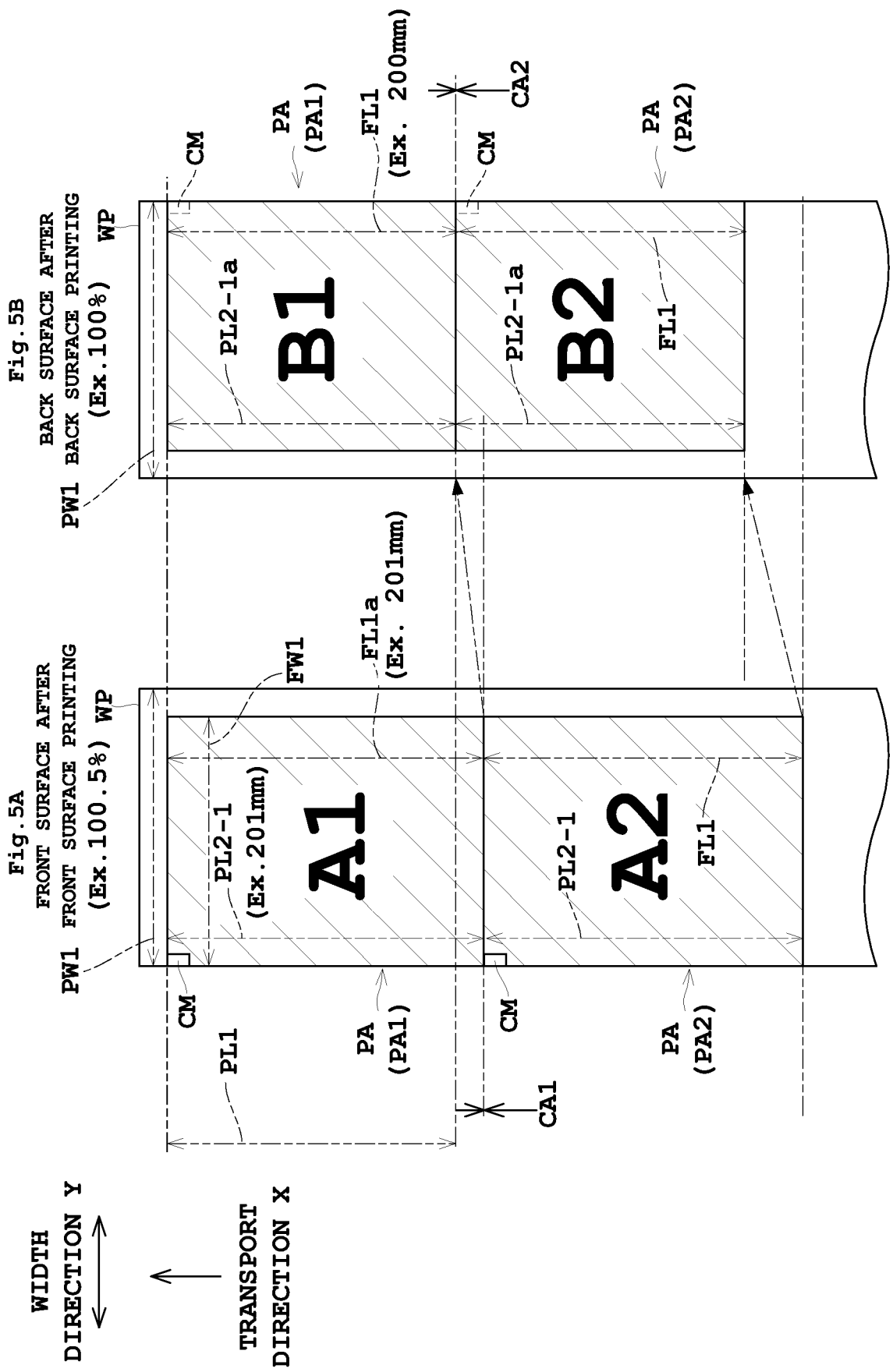

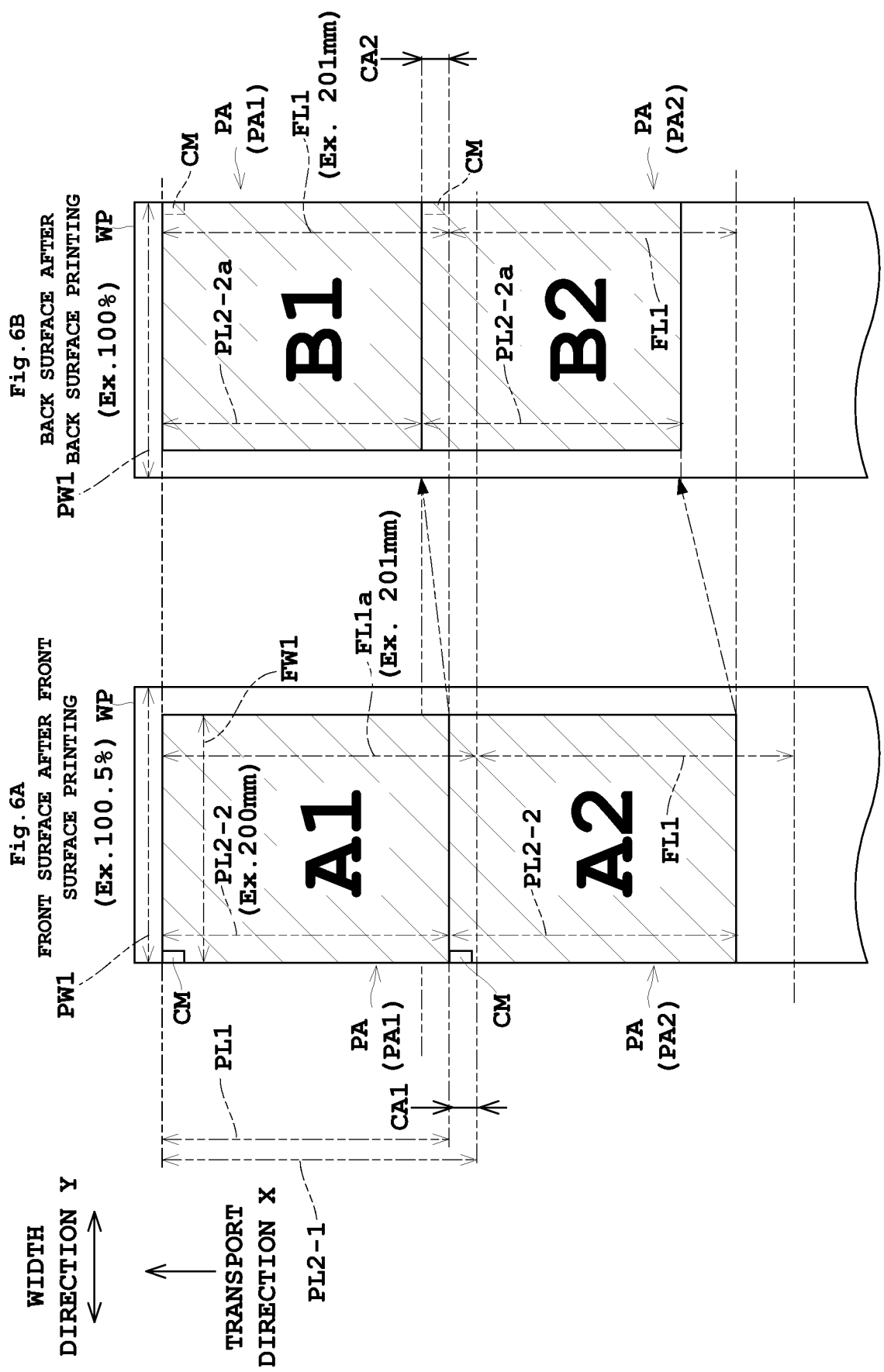

PRINTING APPARATUS

BACKGROUND OF THE INVENTION

(1) Field of the Invention

This invention relates to a printing apparatus for printing on the front surface of a printing medium, and thereafter printing on the back surface thereof, and more particularly to a technique of registering images on the front and back surfaces.

(2) Description of the Related Art

Conventionally, a known apparatus of this type includes a paper information acquiring unit, a front surface printing condition information acquiring unit, a register information creating unit, and a back surface printing unit. See Japanese Unexamined Patent Publication No. 2014-144608, for example.

In the apparatus having such construction, the paper information acquiring unit acquires paper information as information on printing paper. The front surface printing condition information acquiring unit acquires front surface printing condition information. Based on the paper information and front surface printing condition information acquired as above, the register information creating unit creates register information in a width direction of the printing paper after images are printed on the front surface thereof. The back surface printing unit carries out a register correction using the register information at the time of back surface printing.

The above apparatus performs printing, taking into account an elongation or contraction in the width direction of the printing paper at the time of drying after the front surface printing. Any position shifting in the width direction between the prints on the front and back surfaces can be inhibited.

However, the conventional example with such construction has the following problems.

With the printing paper, elongation or contraction can easily occur in a certain direction depending on the direction of its fiber grain. Particularly where the printing paper is long web paper, tension is applied in the transport direction at the time of transportation, and the web paper tends to elongate or contract in the transport direction after front surface printing.

When, for example, the web paper elongates after front surface printing, a length between cue marks which show print start positions at the time of front surface printing will increase at the time of back surface printing. Then, when back surface printing is done with the same page length as at the time of front surface printing, a gap will occur in the form of a white streak between the pages. Such a white streak is about 0.1-0.2 mm, for example, but is very conspicuous, which poses a problem of lowering print quality on the back surface. Conversely, when the web paper contracts after front surface printing, a back surface image is not fit within a page and is cut out. This results in low print quality on the back surface. The print quality due to the white streak or cutting, referred to herein, is subject to various judgments depending on the user's desires and product prints. In some instances, for example, a small amount of cutting, despite white streaks, may be considered good print quality, and in other instances, an absence of white streaks despite a large amount of cutting may be considered good print quality.

SUMMARY OF THE INVENTION

This invention has been made having regard to the state of the art noted above, and its object is to provide a printing apparatus which can prevent lowering of print quality on the back surface due to an elongation or contraction of a printing medium by correcting front surface image data based on elasticity information on the printing medium.

To fulfill the above object, this invention provides the following construction.

A printing apparatus for printing on a front surface of a printing medium, and thereafter printing on a back surface of the printing medium, according to this invention, comprises a front surface print head for printing a front surface image based on front surface image data, over a surface page length on the front surface of the printing medium transported in a predetermined transport direction; a back surface print head for printing a back surface image based on back surface image data, on the back surface of the printing medium after the front surface image is printed; a data corrector for creating corrected front surface image data from the front surface image data by correcting an image size of the front surface image data based on elasticity information in the transport direction after printing of the front surface image; and a printing controller for controlling the front surface print head to perform printing based on the corrected front surface image data, on the front surface of the printing medium, and controlling the back surface print head to perform printing on the back surface of the printing medium.

According to this invention, the data corrector creates corrected front surface image data based on the elasticity information. The printing controller controls the front surface print head to print the surface image based on the corrected front surface image data over the surface page length on the front surface of the printing medium, and controls the back surface print head to perform printing on the back surface of the printing medium. The printing of the front surface image is performed based on the corrected front surface image data which reflects an elongation or contraction in the transport direction after printing of the front surface image. This can prevent lowering of print quality on the back surface due to the elongation or contraction of the printing medium.

In this invention, it is preferred that the apparatus further comprises an elasticity information memory for storing the elasticity information beforehand;

wherein the data corrector creates the corrected front surface image data based on the elasticity information.

Test printing covering the front and back surfaces is carried out before printing products as the final results, and the degree of influence, obtained from the test printing, of an elongation or contraction of the front surface printing on the back surface printing is stored as the elasticity information in the elasticity information memory. The data corrector corrects the image size of the front surface image data based on the elasticity information, thereby to absorb the influence of the front surface printing on the back surface printing.

In this invention, it is preferred that the apparatus further comprises an instructing unit for instructing whether or not to correct the surface page length at a time of front surface printing by the front surface print head; and a surface page length corrector for correcting the surface page length according to the elasticity information, to a corrected surface page length, when the instructing unit gives an instruction to correct the surface page length; wherein the printing controller controls the front surface print head to perform printing over the corrected surface page length.

When the instructing unit gives an instruction to correct the surface page length, the surface page length corrector corrects the surface page length according to the elasticity information, thereby to set a corrected surface page length. The printing controller causes the front surface print head to print a surface image having the corrected surface page length. This can eliminate the possibility of white streaks or cut portions occurring at the time of front surface printing with printing media for which the surface page length can be changed with no problem, unlike printing media for which the surface page length cannot be changed (such as a printing medium with punch holes formed therein, and a printing medium having cue marks already printed thereon at the time of additional printing). Consequently, this feature can prevent lowering of print quality on the front surface, and can also cope with various types of print quality.

In this invention, it is preferred that the apparatus further comprises a front surface image cut amount computing unit for calculating a difference between the surface page length and the image size of the front surface image in the transport direction of the corrected front surface image data; and an error checker for determining that an error has occurred when the difference exceeds a limiting value set beforehand.

The front surface image cut amount computing unit calculates a difference between the surface page length and the image size of the front surface image in the transport direction of the corrected front surface image data. The error checker determines that an error has occurred when the difference exceeds a limiting value. Thus, the user can learn that the degree of correction of the front surface image data has exceeded the limiting value.

In this invention, it is preferred that the apparatus further comprises an alarm for notifying the error when the error checker determines an occurrence of the error.

The notification given by the alarm of an error can make the operator of the apparatus aware of an occurrence of failure. This can prevent a continued printing carried out in a state of the degree of correction exceeding the limiting value.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIGS. 3A-3C are schematic views showing a conventional printing process, in which FIG. 3A is a front surface of web paper after front surface printing, FIG. 3B is a front surface of the web paper after front surface drying, and FIG. 3C is a back surface of the web paper after back surface printing;

FIGS. 5A and 5B are views illustrating a printing process including a change of surface page length, in which FIG. 5A is the front surface of the web paper after front surface printing and before a drying process, and FIG. 5B is the back surface of the web paper after back surface printing; and FIGS. 6A and 6B are views illustrating a printing process including no change of surface page length, in which FIG. 6A is the front surface of the web paper after front surface printing and before a drying process, and FIG. 6B is the back surface of the web paper after back surface printing.

DESCRIPTION OF THE PREFERRED EMBODIMENTS

One embodiment of this invention will be described hereinafter with reference to the drawings.

Figure 1:
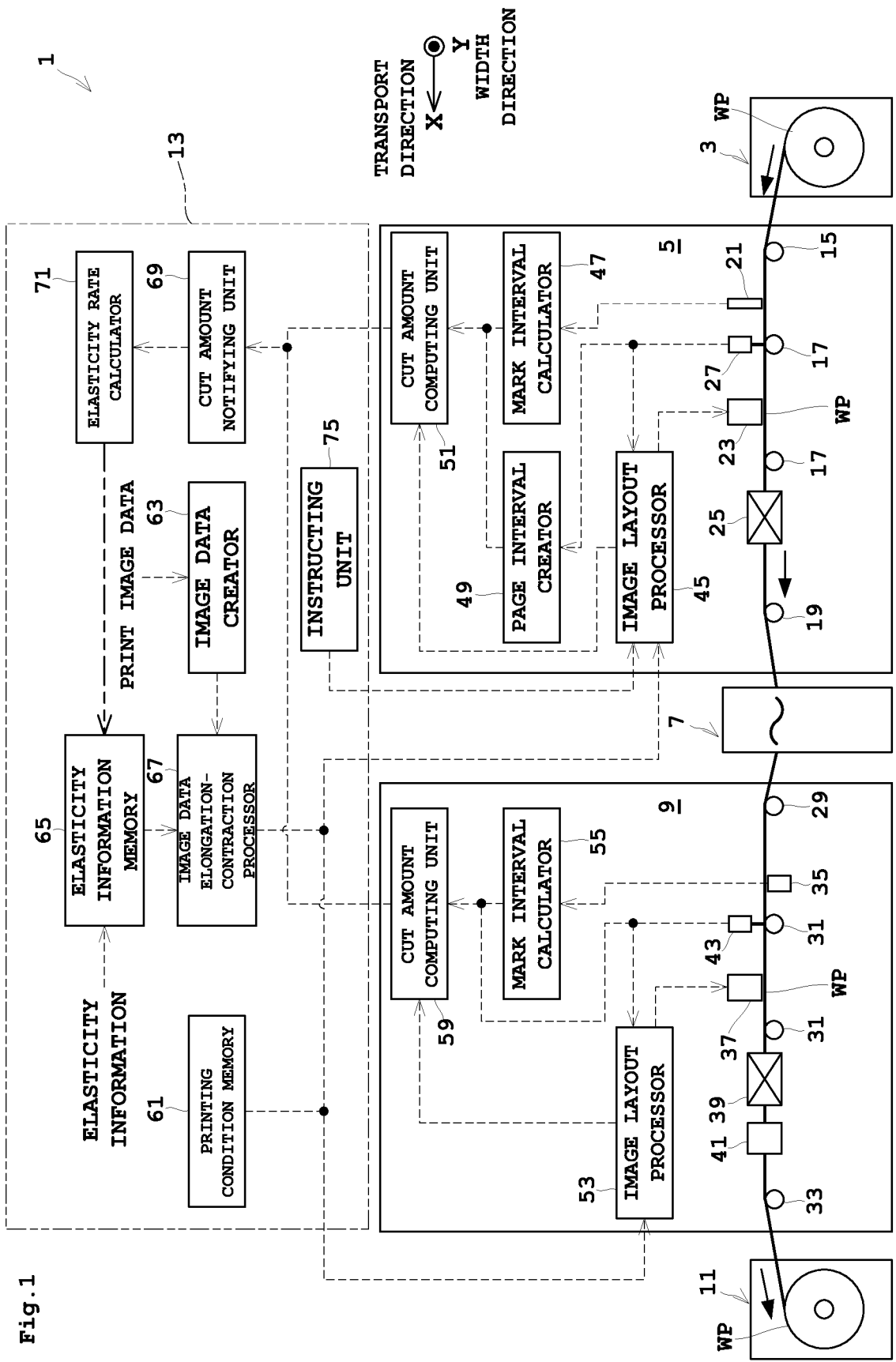
FIG. 1 is a block diagram showing an entire inkjet printing system according to an embodiment.

FIG. 1 is a block diagram showing an entire inkjet printing system according to the embodiment.

An inkjet printing system 1 according to this embodiment includes a paper feeder 3, a front surface printing unit 5, an inverting unit 7, a back surface printing unit 9, a takeup roller 11, and a computer 13.

The paper feeder 3 holds a roll of web paper WP to be rotatable about a horizontal axis. The paper feeder 3 unwinds the web paper WP to feed it in a transport direction X to the front surface printing unit 5. The takeup roller 11 winds up into a roll form around a horizontal axis the web paper WP printed on the two surfaces thereof by the front surface printing unit 5 and back surface printing unit 9.

The web paper WP noted above corresponds to the "printing medium" in this invention. The inkjet printing system 1 corresponds to the "printing apparatus" in this invention.

The front surface printing unit 5 has a drive roller 15 located adjacent the paper feeder 3 for taking in the web paper WP from the paper feeder 3. The web paper WP unwound from the paper feeder 3 by the drive roller 15 is transported downstream along a plurality of transport rollers 17. The front surface printing unit 5 has a drive roller 19 in the most downstream position thereof. Between the drive roller 15 and drive roller 19, a first detector 21, a print head 23, and a drying unit 25 are arranged in order from upstream.

The first detector 21 is located adjacent one end in a width direction Y of the web paper WP and opposed to the upper surface of the web paper WP. The first detector 21 detects punch holes formed in the one end of the web paper WP, cue marks formed on the web paper having undergone printing, and reference marks indicating printing start positions for front surface images, such as preprinting marks indicating printing start positions in time of additional printing. The first detector 21 outputs detection signals upon detection of these marks. The first detector 21 preferably is in the form of a reflection or transmission type light sensor, for example. In the case of web paper WP having punch holes formed therein, a detection signal is outputted when each punch hole is detected. Thus, for example, a reference position for printing is a middle point in the transport direction X between punch holes acquired from an arithmetic operation.

The print head 23 has a plurality of nozzles arranged over the width direction Y. Each nozzle dispenses ink droplets on the web paper WP. Consequently, the print head 23 prints front surface images on the web paper WP in a noncontact mode. The print head 23 performs flushing for eliminating non-dispensation in each nozzle of the print head 23, printing of test charts for confirming printing accuracy, printing of product images as final results, printing of test images which are not products, printing of cue marks and preprinting marks serving as reference marks indicating print starting positions, and so on.

The drying unit 25 carries out a drying process on the web paper WP printed by the printing head 23. The transport roller 17 located upstream of the print head 23 has an encoder 27 for detecting rotation of the transport roller 17. This encoder 27 outputs pulse signals corresponding to rotation distance and rotating speed of the transport roller 17 rotatable with transportation of the web paper WP.

The above print head 23 corresponds to the "front surface print head" in this invention.

The inverting unit 7 includes a plurality of rollers not shown. The inverting unit 7 turns upside down the web paper WP fed from the drive roller 19 of the front surface printing unit 5. The inverting unit 7 feeds the inverted web paper WP to the back surface printing unit 9.

The back surface printing unit 9 has a drive roller 29 located adjacent the inverting unit 7 for taking in the web paper WP from the inverting unit 7. The web paper WP taken in by the drive roller 29 is transported downstream along a plurality of transport rollers 31. A drive roller 33 is disposed in the most downstream position. Between the drive roller 29 and drive roller 33, a second detector 35, a print head 37, a drying unit 39, and a bifacial inspecting unit 41 are arranged in order from upstream.

The second detector 35 is located adjacent the other end in the width direction Y of the web paper WP, and opposed to the lower surface of the web paper WP. The second detector 35 detects the cue marks indicating the printing start positions in the transport direction X of the front surface images printed by the print head 23 of the front surface printing unit 5, and reference marks such as preprinting marks indicating printing start positions in time of additional printing. The second detector 35 outputs detection signals upon detection of these marks.

The print head 37 has, as does the print head 23, a plurality of nozzles over the width direction Y for dispensing ink droplets on the web paper WP. Consequently, the print head 37 prints back surface images on the web paper WP in a noncontact mode. The print head 37, as does the print head 23, performs flushing, printing of test charts, printing of product images as final results, printing of test images which are not products, test printing, and so on.

The drying unit 39 carries out a drying process on the web paper WP printed by the print head 37. The bifacial inspecting unit 39 inspects the front surface images and back surface images printed by the print heads 23 and 37. The transport roller 31 located upstream of the print head 37 has an encoder 43 for detecting a rotational frequency of the transport roller 29. This encoder 43 outputs pulse signals corresponding to rotation distance and rotating speed of the transport roller 31 rotatable with transportation of the web paper WP.

The above print head 37 corresponds to the "back surface print head" in this invention.

The computer 13 performs overall control of the above-noted paper feeder 3, front surface printing unit 5, inverting unit 7, back surface printing unit 9, and takeup roller 11. The computer 13 has a CPU, memory, and so on, and receives print image data including print images and various control data from a host computer not shown. Based on this print image data received, the computer 13 controls the front surface printing unit 5, back surface printing unit 9, and so on, to execute printing on the web paper WP. The above front surface printing unit 5 and back surface printing unit 9 further include the following components.

The front surface printing unit 5 includes an image layout processor 45, a mark interval calculator 47, a page interval creator 49, and a cut amount computing unit 51.

The image layout processor 45, in response to the image data of front surface images outputted mainly from the computer 13, operates the drive rollers 15 and 19 and print head 23 to print the front surface images on the web paper WP while transporting the web paper WP at a transport speed appropriate to printing conditions. At this time, the mark interval calculator 47, based on the detection signal from the first detector 21, calculates a mark interval in the transport directions X between the cue marks or between the preprinting marks already printed on the front surface of the web paper WP.

The page interval creator 49, based on the pulse signal from the encoder 27 outputted in response to rotation of the transport roller 17, calculates a page interval with reference to the cue marks, preprinting marks, or an appropriate point of time. These mark interval and page interval are given to the cut amount computing unit 51.

The cut amount computing unit 51 compares the mark interval or page interval and the image size of the front surface image in the transport direction X received from the image layout processor 45, or determines a difference between a surface page length set to a printing area and the image size of the front surface image in the transport direction X. Then, the cut amount computing unit 51 calculates a numerical value of the size (an excessive part) of the image not printed since it protrudes from the surface page length, or of the size (a lacking part) of the image area which is short of the surface page length. This numerical value is called a cut amount which, in practice, is often expressed in the number of lines corresponding to the row in the transport direction X of the nozzles in the print head 23. The calculated cut amount is outputted to the computer 13.

The above image layout processor 45 corresponds to the "surface page length corrector" in this invention. The cut amount computing unit 51 corresponds to the "front surface image cut amount computing" in this invention.

The back surface printing unit 9, as does the front surface printing unit 5 described above, includes an image layout processor 53, a mark interval calculator 55, and a cut amount computing unit 59.

The image layout processor 53, in response to the image data of back surface images outputted mainly from the computer 13, operates the drive rollers 29 and 33 and print head 37 to print the back surface images on the web paper WP while transporting the web paper WP at the transport speed. At this time, the mark interval calculator 55 calculates a mark interval based on the detection signal from the second detector 35 in accordance with the cue marks or preprinting marks. The interval between the cue marks detected at this time corresponds to the page interval in the transport direction X after the front surface printing. When setting initial elasticity information, calculations can be made based on a difference between the mark interval in the transport direction X after the drying process which is the above calculated interval between the cue marks, and the mark interval in the transport direction X before the drying process which is the interval between the cue marks printed at the time of front surface printing by the print head 23 under control of the image processing layout processor 45. The cut amount computing unit 59 determines a difference between the page length based on the mark interval and the image size in the transport direction X of the back surface image from the image layout processor 53, and as does the image layout processor 45, calculates the size of an excessive part or a lacking part as a cut amount. The cut amount is outputted to the computer 13.

The computer 13 includes a printing condition memory 61, an image data creator 63, an elasticity information memory 65, an image data elongation-contraction processor 67, a cut amount notifying unit 69, an elasticity rate calculator 71, and an instructing unit 75.

The printing condition memory 61 stores beforehand printing conditions such as transport speed for transporting the web paper WP, drying temperature of the drying unit 25, and so on.

The image data creator 63 receives print image data including front surface image data and back surface image data from the host computer not shown, for example, and creates image data by executing image processing to make data suited to printing by the front surface printing unit 5 and back surface printing unit 9.

The elasticity information memory 65 stores elasticity rates. These elasticity rates represent rates of elongation and contraction in the transport direction X of the web paper W when the drying process has been carried out by the drying unit 25 after the front surface images are printed. At first, these rates are set based on the mark interval detected by the back surface printing unit 9 after the front surface printing, or are set based on the cut amounts of back surface images after test printing as described hereinafter.

The image data elongation-contraction processor 67 performs an elongation-contraction process on the image data from the image data creator 63 based on the elasticity rates in the elasticity information memory 65.

The cut amount notifying unit 69 notifies the user of cut amounts of the front and back surfaces provided by the cut amount computing units 51 and 59. By referring to this notification, the user can determine whether or not the printing satisfies the intended quality. The cut amount notifying unit 69 has a limiting value set beforehand, and compares the limiting value and the cut amount described hereinafter. When the cut amount exceeds the limiting value, the notifying unit 69 notifies that an error has occurred. Since the user can learn the occurrence of an error in this way, the user can take an appropriate action such as stopping the printing, thereby to prevent continuation of the printing process with low print quality.

The elasticity rate calculator 71 calculates elasticity rates based on the cut amounts of the front and back images received through the cut amount notifying unit 69. These elasticity rates are given as 99.5% and 100.5%, for example. The elasticity rates calculated by the elasticity rate calculator 71 are reflected in the elasticity rates in the elasticity information memory 65 as necessary.

The instructing unit 75 is operable by the user to instruct whether or not to correct a surface page length at the time of front surface printing.

The above computer 13 corresponds to the "printing controller" in this invention. The image data elasticity processor 67 corresponds to the "data corrector" in this invention. The cut amount notifying unit 69 corresponds to the "error checker" and "alarm" in this invention.

Figure 2:
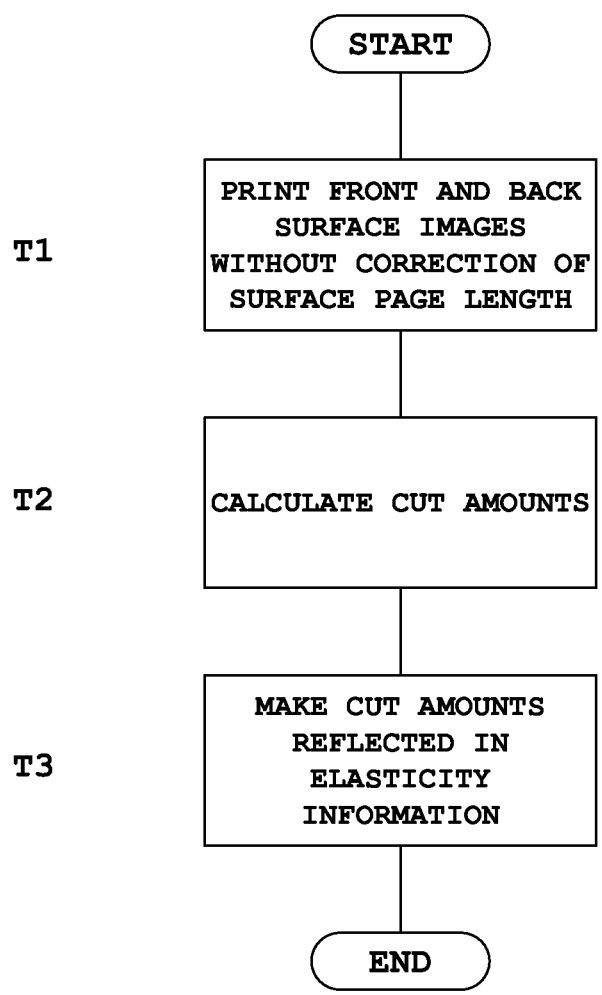
FIG. 2 is a flow chart showing one example of test printing.
Figure 3:
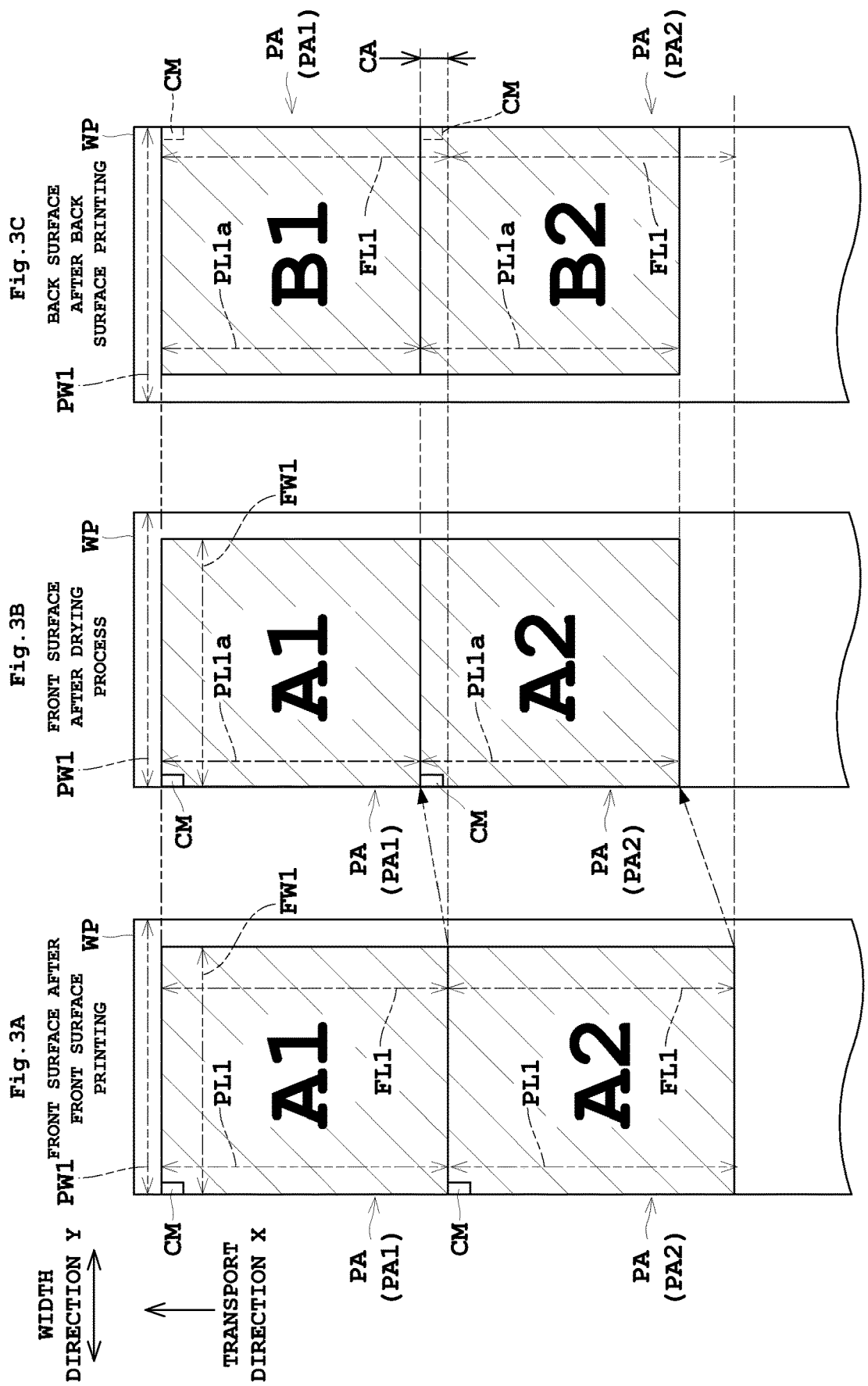

Next, the cut amounts resulting from printing on the front and back surfaces will be described with reference to FIGS. 2 and 3A-3C. FIG. 2 is a flow chart showing one example of test printing. FIGS. 3A-3C are schematic views showing a conventional printing process, in which FIG. 3A is a front surface of web paper after front surface printing thereon, FIG. 3B is a front surface of the web paper after front surface drying, and FIG. 3C is a back surface of the web paper after back surface printing Step T1

Printing (test printing) is done on the front and back surfaces, which printing is not for final products. For image data, preferably, print image data for final products is used, and printing is done with the printing conditions thereof. This is because the elasticity rate changes with the images printed on the web paper WP and with the printing conditions. It is assumed here that, in the initial stage, the elasticity information memory 65 has set thereto elasticity rate=100% (multiplied by 1, which means that there is no elongation or contraction) in both the front and back surfaces, and that an instruction has been given through the instructing unit 75 not to change the surface page length. After printing with these conditions, since the web paper WP elongates or contracts after the front surface printing, there will occur a disagreement between the surface page length and the image size in the transport direction X of the back surface image data.

Step T2

Cut amounts are calculated from printing results of the front and back images. The cut amount computing units 51 and 59 calculate cut amounts for the front and back images.

Step T3

The cut amounts are reflected in the elasticity information. The elasticity rate calculated by the elasticity rate calculating unit 71 based on the cut amounts is reflected in the elasticity rate in the elasticity information memory 65.

After the above processes, printing is done on the front and back surfaces again. Then, the cut amounts are calculated again, which are reflected in the elasticity rate. These steps are repeated to make adjustment for the cut amounts of the back surface images to match what is desired as print quality.

Reference is now made to FIGS. 3A-3C. As shown in FIG. 3A, of print pages PA on the web paper WP, a cue mark CM and a front surface image A1 based thereon are printed on a first page PA1, and a cue mark CM and a front surface image A2 based thereon are printed on a second page PA2. Various sizes at this point are assumed, such as paper width PW1 in the width direction Y of the web paper WP, surface page length PL1 which is a printing area length in the transport direction X of the print pages PA, image size FL1 in the transport direction X of the surface image data, and the image size FW1 in the width direction Y of the surface image data.

Following the front surface printing, and after the drying process by the drying unit 25, the images become as shown in FIG. 3B, for example. Specifically, the surface page length PL1 of the printed front surface images A1 and A2 is contracted to surface page length PL1a (PL1a<PL1). Since the front surface images A1 and A2 contract with the web paper WP, the image size FL1 in the transport direction X which is the length of the surface images A1 and A2 becomes equal to the surface page length PL1a.

Following the front surface printing, and after the drying process, back surface printing is done to print back surface images B1 and B2. The back surface images B1 and B2 have the image size FL1 in the transport direction X equal to the image size of the front surface images A1 and A2. Consequently, when the back surface images B1 and B2 are printed as they are, the back surface images B1 and B2 of image size FL1 (>PL1a) are printed over the contracted surface page length PL1a as shown in FIG. 3C. The back surface image B1 does not fit in the surface page length PL1a, its downstream part is cut, and the next back surface image B2 is printed. Since printing is stopped for the next cue mark CM not shown, the back surface image B2 has a downstream part similarly cut off. A cut amount CA at this time is calculated by the cut amount computing unit 59 based on the detection signal from the second detector 35 and an instruction on printing from the image layout processor 53, that is from an interval between the cue marks and the image size FL1 in the transport direction X of the back surface image B 1. The cut amount CA is notified through the cut amount notifying unit 69, and an elasticity rate is calculated by the elasticity rate calculating unit 71. This elasticity rate is set to the elasticity information memory 65.

Figure 4:
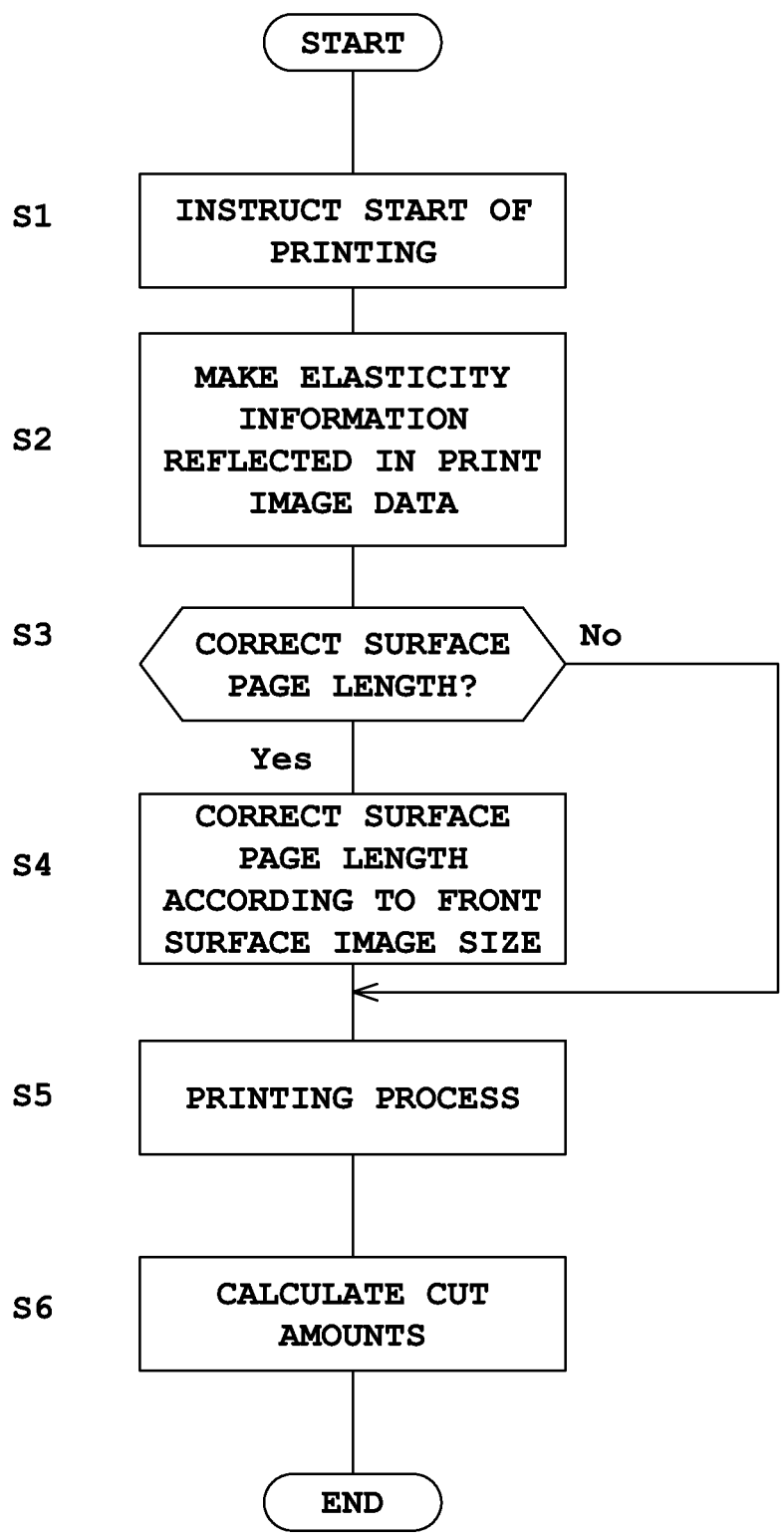
FIG. 4 is a flow chart showing a printing process according to the embodiment.

Next, printing of products carried out after the above test printing will be described with reference to FIG. 4 to FIGS. 6A and 6B. FIG. 4 is a flow chart showing a printing process according to this embodiment. FIGS. 5A and 5B are views illustrating a printing process including a change of surface page length, in which FIG. 5A is the front surface of the web paper WP after front surface printing and before a drying process, and FIG. 5B is the back surface of the web paper WP after back surface printing. FIGS. 6A and 6B are views illustrating a printing process including no change of surface page length, in which FIG. 6A is the front surface of the web paper WP after front surface printing and before the drying process, and FIG. 6B is the back surface of the web paper WP after back surface printing.

Step S1

The operator instructs the inkjet printing system 1 to start printing.

Step S2

The image data elongation-contraction processor 67 makes the elasticity information reflected in the printing image data received from the host computer not shown. Specifically, the image data elongation-contraction processor 67 corrects the front surface images A1 and A2 with reference to the elasticity information in the elasticity information memory 65. In the above example, since the length in the transport direction X of the web paper WP contracts after the front surface printing. So the elasticity information is assumed, for example, to provide elasticity rate 100.5% (a contraction of 0.5% occurs). Consequently, taking this into consideration, the front surface images A1 and A2 are elongated in the transport direction X to correct the image size FL1 in the transport direction X to the image size FL1$a$ (>FL1), thereby creating corrected front surface image data for the front surface images A1 and A2.

To give specific numerical values by way of example, when the image size in the transport direction X of the front surface images A1 and A2 is 200 mm, since the elasticity rate is 100.5%, the image size in the transport direction X is enlarged by 0.5%. That is, the image size FL1=200 mm in the transport direction X is corrected to 201 mm. This is set as corrected surface image data (FL1$a$=201 mm).

Step S3

The user instructs through the instructing unit 75 whether to correct the surface page length or not. Here, the case of a correction being instructed will be described first.

Step S4

As shown in FIGS. 5A and 5B, the image layout processor 45 corrects the surface page length PL1 for arranging the corrected surface image data of the front surface images A1 and A2 to corrected surface page length PL2-1.

To give specific numerical values by way of example, when the surface page length PL1=200 mm, the surface page length PL1 is elongated by 0.5% from the elasticity rate 100.5% which is the elasticity information. That is, the corrected surface page length PL2-1 becomes 201 mm.

Step S5

The computer 13 operates the image layout processors 45 and 53 to print the corrected front surface image data of the front surface images A1 and A2 over the corrected surface page length PL2-1 as shown in FIG. 5A. Then, the web paper WP contracts through the drying process, resulting in a print page length PL2-1$a$ (<PL2-1) as shown in FIG. 5B. Regarding the back surface, for example, the back surface images B1 and B2 are printed as they are, without being corrected.

In a specific numerical value, printing is done in the original image size FL1=200 mm. At this time, the web paper WP contracts after the front surface images A1 and A2 are printed from the corrected front surface image data. However, the image size in the transport direction X of the front surface images A1 and A2 has been elongated beforehand in accordance with the contraction, and so the surface page length has been elongated to the corrected surface page length PL2-1 to offset the contraction. Consequently, even if printed without correcting the image size of the back surface images B1 and B2, the image sizes of the front surface images A1, A2 and back surface images B1, B2 can be made equal. Further, not only the cut amount CA1 of the front surface images but the cut amount CA2 of the back surface images can be reduced substantially to zero.

Step S6

When the front surface images are corrected at the time of printing as described above, the cut amount CA2 of the back surface images should become substantially zero. However, the cut amount CA2 of the back surface images does not become close to zero when printing environment changes, the temperature setting of the drying unit 25 slightly changes from a setting, the tension applied to the web paper WP deviates from the printing conditions, or the print image data is greatly different from what it was at the time of setting the elasticity rate. In that case, the cut amount computing unit 59 calculates a cut amount CA2 of the back surface images, and gives the cut amount CA2 to the cut amount notifying unit 69. From this notification, the user can learn that the cut amount CA2 has occurred for the back surface images. Consequently, the elasticity information in the elasticity information memory 65 can be corrected based on the new cut amount CA2. This realizes improvement in the print quality of the back surface images.

Next, the case of an instruction given in step S3 not to correct the surface page length will be described with reference to FIGS. 6A and 6B.

In this case, the procedure remains the same up to the correction of the image size FL1 in the transport direction X of the front surface images A1 and A2 to the image size FL1$a$ according to the elasticity information. However, the surface page length PL1 is set to surface page length PL2-2 which is the same as the surface page length PL1.

To give specific numerical values by way of example here, for the image size of the front surface images A1 and A2, the image size FL1=200 mm in the transport direction X is corrected to 201 mm, which is set as corrected surface image data (FL1$a$=201 mm). The surface page length PL2-2 remains to be 200 mm.

Step S5

When the computer 13 executes printing with the above setting, the results are as shown in FIGS. 6A and 6B.

That is, the front surface images A1 and A2, since printed from the corrected front surface image data, as shown in FIG. 6A, are printed in the corrected image size FL1$a$ (e.g. 201 mm) to have the surface page length PL2-2 (e.g. 200 mm) which is not corrected. It is assumed that the surface page length PL2-2 elongates or contracts through the drying process, and as shown in FIG. 6B, becomes surface page length PL2-2a (e.g. 200 mm) after the printing. Since the back surface images B1 and B2 are printed as they are, without correction, the image size in the transport direction X of the back surface images B1 and B2 is image size FL1 (e.g. 201 mm) whose size in the transport direction X is longer than the surface page length PL2-2a after the printing.

Step S6

Consequently, for the front surface images, (corrected image size FL1a)−(surface page length PL2-2) makes the cut amount CA1 of the front surface images. For the back surface images, (image size FL1)−(surface page length PL2-2a) makes the cut amount CA2 of the back surface images. In other words, there is a difference in image size between the front surface images A1, A2 and the back surface images B1, B2 (front surface image size<back surface image size), and furthermore excessive portions occur with the front surface images A1, A2 and the back surface images B1, B2, which portions are cut. This can be said a lowering of print quality, but depending on the products printed by the user, the lowering of print quality may be more aptly blamed on occurrence of white steaks due to the deficiencies than a disagreement in image size or occurrence of cuts. In such a case, the instructing unit 75 may be operated to select a desired print quality.

A page length cannot be changed when the web paper WP has punch holes, or when the cue marks CM and preprinting marks are already printed as on preprinted paper (additional printing). When printing on these printing media, therefore, printing can be done with desired quality by instructing through the instructing unit 75 not to correct the surface page length, as described above, i.e. to print without executing step S4.

According to this embodiment, printing of the front surface images A1 and A2 by the image data elasticity processor 67 is performed based on the corrected surface image data of image size FL1a which reflects an elongation or contraction in the transport direction X of the front surface images A1 and A2 after printing. This can prevent a lowering of print quality of the back surface images B1 and B2 due to the elongation or contraction of the web paper WP.

Further, by instructing through the instructing unit 75 whether to correct the surface page length or not, a lowering of print quality on the front surface can also be prevented, and various types of print quality can be accommodated.

This invention is not limited to the foregoing embodiment, but may be modified as follows:

(1) The foregoing embodiment has been described exemplifying the case of the web paper WP being contracted by the drying process. However, the same effect can be realized in the case of an elongation resulting from the drying process, by contracting the image size of the front surface images A1 and A2, in reverse to the example described above.

(2) In the foregoing embodiment, the image size of the front surface images A1 and A2 is corrected according to the elasticity information. However, this invention does not rule out a correction of the image size of the back surface images B1 and B2. For example, in the example shown in FIGS. 6A and 6B, the image size of back surface images B1 and B2 may be contracted based on the elasticity information to correct the cut amount CA2 to be substantially zero. Consequently, the print quality of the back surface images can be selected from a further increased variety.

(3) The foregoing embodiment includes the instructing unit 75 for instructing whether to correct the surface page length or not. This invention does provide this construction as indispensable. That is, this construction may be varied not to correct the surface page length. Consequently, the construction can be simplified to reduce apparatus cost, and the process performed by the image layout processor 45 can be simplified, thereby to lighten processing load requiring arithmetic operations and so on.

(4) The foregoing embodiment has been described taking the web paper WP as an example of printing media. This invention is not limited to this printing medium. For example, this invention is applicable to other printing media than paper, such as plastic film.

This invention may be embodied in other specific forms without departing from the spirit or essential attributes thereof and, accordingly, reference should be made to the appended claims, rather than to the foregoing specification, as indicating the scope of the invention.

What is claimed is:

1. A printing apparatus for printing on a front surface of a printing medium, and thereafter printing on a back surface of the printing medium, the apparatus comprising:
    a front surface print head for printing a front surface image based on front surface image data, over a surface page length on the front surface of the printing medium transported in a predetermined transport direction;
    a back surface print head for printing a back surface image based on back surface image data, on the back surface of the printing medium after the front surface image is printed;
    a data corrector for creating corrected front surface image data from the front surface image data by correcting an image size of the front surface image data based on elasticity information in the transport direction after printing of the front surface image; and
    a printing controller for controlling the front surface print head to perform printing based on the corrected front surface image data, on the front surface of the printing medium, and controlling the back surface print head to perform printing on the back surface of the printing medium.

2. The printing apparatus according to claim 1, further comprising an elasticity information memory for storing the elasticity information beforehand;
    wherein the data corrector creates the corrected front surface image data based on the elasticity information.

3. The printing apparatus according to claim 1, further comprising:
    an instructing unit for instructing whether or not to correct the surface page length at a time of front surface printing by the front surface print head; and
    a surface page length corrector for correcting the surface page length according to the elasticity information, to a corrected surface page length, when the instructing unit gives an instruction to correct the surface page length;
    wherein the printing controller controls the front surface print head to perform printing over the corrected surface page length.

4. The printing apparatus according to claim 2, further comprising:
    an instructing unit for instructing whether or not to correct the surface page length at a time of front surface printing by the front surface print head; and
    a surface page length corrector for correcting the surface page length according to the elasticity information, to a corrected surface page length, when the instructing unit gives an instruction to correct the surface page length;

wherein the printing controller controls the front surface print head to perform printing over the corrected surface page length.

5. The printing apparatus according to claim 1, further comprising:

a front surface image cut amount computing unit for calculating a difference between the surface page length and the image size of the front surface image in the transport direction of the corrected front surface image data; and an error checker for determining that an error has occurred when the difference exceeds a limiting value set beforehand.

6. The printing apparatus according to claim 2, further comprising:

a front surface image cut amount computing unit for calculating a difference between the surface page length and the image size of the front surface image in the transport direction of the corrected front surface image data; and an error checker for determining that an error has occurred when the difference exceeds a limiting value set beforehand.

7. The printing apparatus according to claim 5, further comprising an alarm for notifying the error when the error checker determines an occurrence of the error.

8. The printing apparatus according to claim 6, further comprising alarm for notifying the error when the error checker determines an occurrence of the error.

9. The printing apparatus according to claim 1, wherein the printing medium is web paper.

10. The printing apparatus according to claim 2, wherein the printing medium is web paper.

11. The printing apparatus according to claim 3, wherein the printing medium is web paper.

12. The printing apparatus according to claim 4, wherein the printing medium is web paper.

13. The printing apparatus according to claim 5, wherein the printing medium is web paper.

14. The printing apparatus according to claim 6, wherein the printing medium is web paper.

15. The printing apparatus according to claim 7, wherein the printing medium is web paper.

16. The printing apparatus according to claim 8, wherein the printing medium is web paper.

17. The printing apparatus according to claim 1, wherein the front surface print head and the back surface print head are configured to dispense ink droplets.

18. The printing apparatus according to claim 2, wherein the front surface print head and the back surface print head are configured to dispense ink droplets.

19. The printing apparatus according to claim 3, wherein the front surface print head and the back surface print head are configured to dispense ink droplets.

20. The printing apparatus according to claim 5, wherein the front surface print head and the back surface print head are configured to dispense ink droplets.

* * * * *